United States Patent [19]

Kubotera et al.

[11] Patent Number: 4,548,537

[45] Date of Patent: Oct. 22, 1985

[54] APPARATUS FOR TAKING UP ROD TYPE MATERIALS

[75] Inventors: Hiroshi Kubotera; Kenji Ogawa; Kenji Hatakeyama, all of Ichihara, Japan

[73] Assignees: Mitsui Engineering & Shipbuilding Co., Ltd.; Kajima Corporation, both of Tokyo, Japan

[21] Appl. No.: 494,331

[22] Filed: May 13, 1983

[30] Foreign Application Priority Data

May 17, 1982 [JP] Japan .................. 57-81497

[51] Int. Cl.⁴ ............... B65G 47/06; B66F 11/00
[52] U.S. Cl. .................. 414/276; 414/226; 414/745; 414/748; 221/7; 221/210; 221/254
[58] Field of Search ........... 414/267, 268, 276–279, 414/281, 675, 680, 745, 743, 748, 753, 226; 221/7, 8, 210, 254; 198/443, 474, 486, 503

[56] References Cited

U.S. PATENT DOCUMENTS

| | | | |
|---|---|---|---|
| 3,400,837 | 9/1968 | Dalik | 414/745 X |
| 3,406,838 | 10/1968 | Davidson | 414/748 |
| 4,036,356 | 7/1977 | Reist | 414/753 X |
| 4,217,068 | 8/1980 | Fossard | 414/753 X |
| 4,266,910 | 5/1981 | Pickard | 414/743 X |
| 4,306,596 | 12/1981 | Kreibaum | 198/486 X |
| 4,316,693 | 2/1982 | Baxter et al. | 198/486 X |
| 4,388,039 | 6/1983 | Schwarze | 414/748 |
| 4,491,214 | 1/1985 | Malivoir et al. | 414/745 X |
| 4,505,374 | 3/1985 | Beerens et al. | 414/748 |

Primary Examiner—Joseph E. Valenza
Assistant Examiner—David A. Bucci
Attorney, Agent, or Firm—Armstrong, Nikaido, Marmelstein & Kubovcik

[57] ABSTRACT

An apparatus for taking up a plurality of rod type materials one by one from a pile of such materials is disclosed in which a plurality of rod type materials are stored temporarily in a rack. A part of a rod type material is separated from the plural rod type materials by a take-up element provided on the rack, and the separated rod material is gripped by a clamp provided in opposition to the take-up element. The rod type material fixed in the clamp is then drawn through a drawing element to be completely separated from the remaining rod type materials in the rack.

6 Claims, 13 Drawing Figures

APPARATUS FOR TAKING UP ROD TYPE MATERIALS

BACKGROUND

This invention relates to an apparatus for taking up a plurality of rod type materials one by one from a pile of such materials.

In an operation for cutting to a predetermined length or bending to a predetermined shape a plurality of rod type materials (or rod type bodies), for example, iron reinforcing rods in an aligned state, the steps of untying a bundle of such materials, aligning a predetermined number of such materials, and feeding the resulting rod type materials to a subsequent step of cutting or bending the same are all carried out by workers.

Consequently, a large number of workers are required, and, moreover, the operation cannot be efficiently carried out in spite of a great deal of labor used. This causes an increase in the personnel expense and processing cost.

SUMMARY

An object of the present invention is to eliminate the above-mentioned inconveniences.

Namely, an object of the present invention is to take up a plurality of rod type materials (or rod type bodies) one by one speedily and reliably from a pile of such materials.

An apparatus for taking up rod type materials according to the present invention, which permits attaining the above objects thereof is characterized in that it consists of at least one take-up means, which is provided on a rack used to temporarily store a plurality of rod type materials thereon, and which is adapted to separate a certain rod type material from the plural materials mentioned above, at least one clamp means provided in opposition to the take-up means and adapted to fix therein the rod type material separated by the take-up means, and at least one means for drawing therethrough the rod type material fixed in the clamp means, which drawing means is so provided that it can be moved in the lengthwise direction of the rack.

Since the present invention is constructed as described above, it permits taking up a plurality of rod type materials one by one speedily and reliably from a pile of such materials.

Accordingly, the efficiency of carrying out an operation for taking up a plurality of rod type materials one by one from a pile of such materials can be improved, and the cost of processing such materials can be reduced.

The above and other characteristics and advantages of the present invention will become apparent from the following description of embodiments taken in conjunction with the accompanying drawings.

DRAWINGS

PREFERRED EMBODIMENTS

Figure 1:
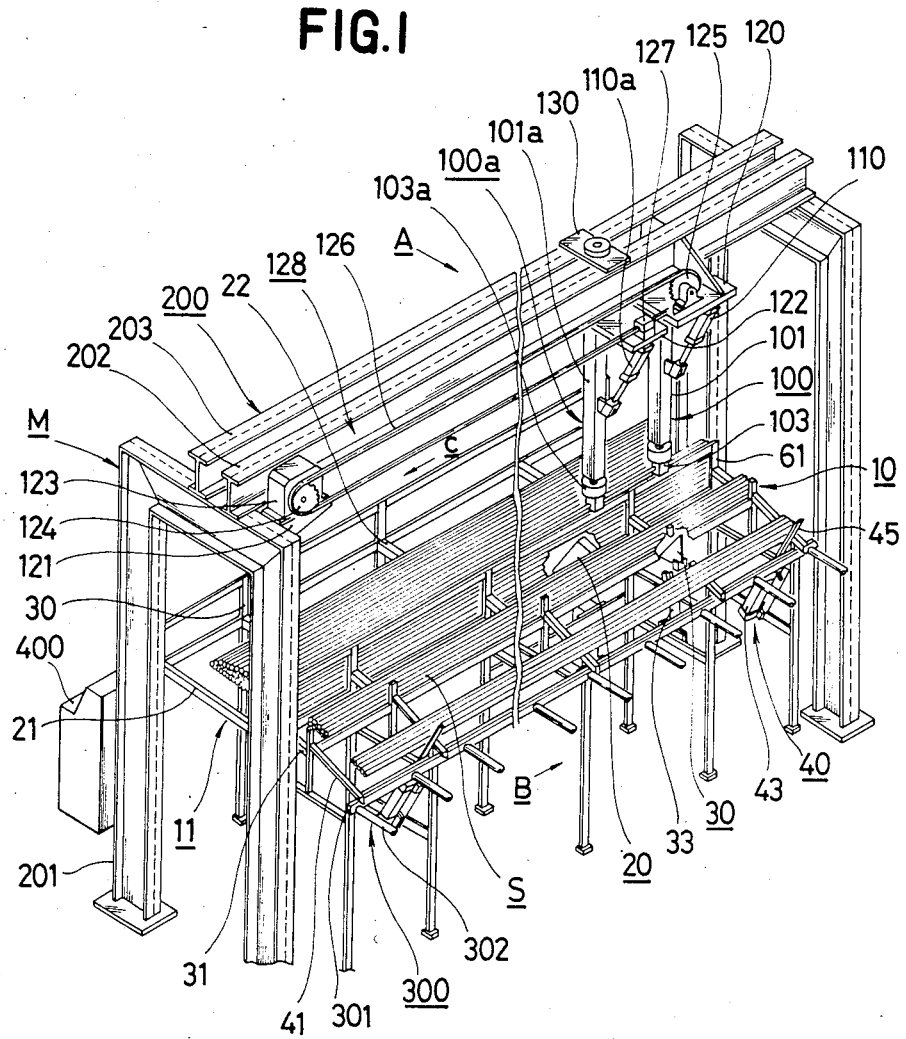
FIG. 1 illustrates a system as a whole for feeding rod type materials, which includes an apparatus for taking up rod type materials according to the present invention.

FIG. 1 illustrates a system M as a whole for feeding rod type materials (or rod type bodies), which includes an apparatus 10 for taking up rod type materials according to the present invention. A support frame 11 in the apparatus 10 is provided on a base (not shown) consisting of a rod-untying rack 21, on which a bundle of rod type materials S, such as iron reinforcing rods is untied, a storage rack 31, on which the rod type materials S are temporarily stored, and a feed rack 41, onto which a predetermined number of rod type materials S are discharged from the storage rack 31.

A transfer means 300 is provided so as to extend parallel to the feed rack 41. The transfer means 300 consists, for example, of a known roller conveyor. The transfer means 300 includes a plurality of rollers 302 rotatably supported on two bars 301. These rollers 302 are adapted to be positively rotated by a known driving means.

Figure 2:
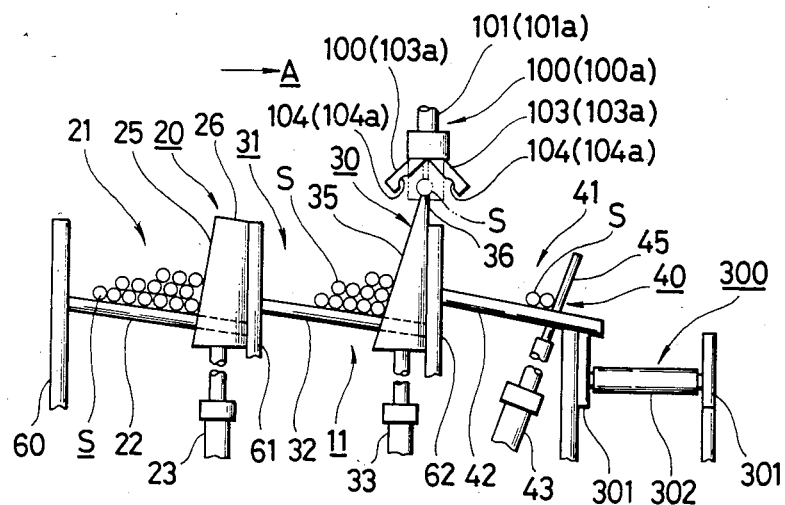
FIG. 2 is a side elevational view in a schematic representation of a rack portion of the system for feeding rod type materials.

The floor beams 22, 32, 42 of the rod-untying rack 21, storage rack 31 and feed rack 41, respectively, are all inclined downward in the lateral direction of an arrow A in FIG. 2, so that the rod type materials S can roll automatically toward the transfer means 300.

The rod-untying rack 21 has feed means 20 spaced at regular intervals in the lengthwise direction thereof. Each of the feed means 20 is formed as shown in FIG. 2, by providing a substantially trapezoidal head 25 on an upper end of a retractable means 23 consisting of a hydraulic cylinder or a pressure air cylinder.

An upper surface 26 of each of the heads 25 is inclined downward toward the storage rack 31 for the rod type materials S, so that the rod type materials S can roll automatically toward the storage rack 31. The upper surface 26 of each of the heads 25 is so formed that, when the upper surface 26 is in an upper limit position, it projects upward from a second frame member 61 provided between the rod-untying rack 21 and storage rack 31, and that, when the upper surface 26 is in a lower limit position, it is lower than a lower surface of each of the floor beams 22. In order to prevent the rod type materials S from dropping into a space between the heads 25 and second frame member 61, the heads 25 are provided in positions close to the second frame member 61, which is disposed on the lower side of the floor beams 22. A first frame member 60 is provided on the outer or higher side of the rod-untying rack 21.

The storage rack 31 is provided with a first take-up means 30. As shown in FIG. 1, the first take-up means 30 is provided in a position close to a lengthwise end portion of the storage rack 31. The first take-up means 30 is formed by providing a triangular head 35 on an upper end of a retractable means 33 consisting of a hydralic cylinder or a pressure air cylinder. The head 35 is provided in its upper end surface with a recess 36 large enough to support one rod type material S therein. The head 35 is so formed that, when the upper end of the head 35 is in an upper limit position, it projects upward from an upper end of a third frame member 62, and that, when the upper end of the head 35 is in a lower limit position, it is lower than a lower surface of each of the floor beams 32. In order to prevent the rod type materials S from dropping into a space between the head 35 and third frame member 62, the head 35 is provided in a position close to the third frame 62, which is disposed on the lower side of the floor beams 32.

The feed rack 41 is provided with a plurality of stoppers 40 spaced at regular intervals in the lengthwise direction thereof. Each of the stoppers 40 is formed by providing a rod type support member 45 on an upper end of a retractable means 43 consisting of a hydraulic cylinder or a pressure air cylinder. When an upper end of each support member 45 is in an upper limit position, it projects upward from the floor beams 42, and, when the upper end of each support member 45 is in a lower limit position, it is lower than lower surfaces of the floor beams 42.

On the other hand, a track 200 is provided above the first take-up means 30 so as to extend along the storage rack 31 as shown in FIG. 1. The track 200 consists of a pair of I-shaped guide members 202 and 203, both end portions of each of which are supported fixedly on gate type columnar members 201.

Figure 3:
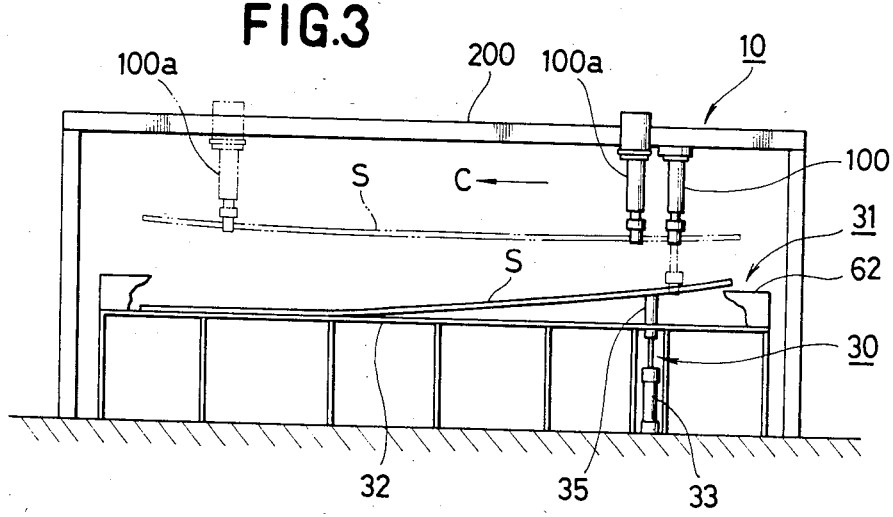
FIG. 3 is a front elevational view illustrating an operation of the apparatus for taking up rod type materials according to the present invention.

The track 200 is provided with a first clamp means 100 and a first drawing means 100a. As shown in FIG. 3, the first clamp means 100 is positioned on the right side of and diagonally above the first take-up means 30, and the first drawing means 100a on the left side of and diagonally above the first take-up means 30.

The first clamp means 100 has a pair of clamp members 103, which can be pivoted to be opened and closed, and which are attached to a lower end portion of a retractable means 101 consisting of a hydraulic cylinder or a pressure air cylinder. The clamp members 103 are provided in their respective inner surfaces with recesses 104 for gripping a rod type material S. The clamp members 103 are also provided with a detector (not shown) consisting of a proximity switch or a pressuresensitive element. When a rod type material S is gripped and sensed by the clamp members 103, a signal representative of the material S is sent therefrom to a counter (not shown) in a control unit 400. Thus, the counting of the number of the rod type materials S is done by the counter.

The retractable means 101 is provided with an auxiliary retractable means 110 at an intermediate portion thereof. The auxiliary retractable means 110 is fixed at its upper end portion to a mount 120, which projects from the track 200 toward the transfer means 300, so as to be inclined.

The first drawing means 100a has a pair of clamp members 103a, which can be pivoted to be opened and closed, and which are attached to a lower end portion of a retractable means 101a consisting of a hydraulic cylinder or a pressure air cylinder. The clamp members 103a are provided in their respective inner surfaces with recesses 104a for gripping a rod type material S. The recesses 104a have a radius greater than that of a rod type material S so as to permit a material S to frictionally pass therethrough when the first drawing means 100a is moved in the lengthwise direction of the storage rack 31.

A slider 130 is provided on the track 200, and the first drawing means 100a is joined to the slider 130. The retractable means 101a is provided with an auxiliary retractable means 110a at an intermediate portion thereof. The auxiliary retractable means 110 is fixed at its upper end portion to a mount 122, which projects from the slider 130 toward the transfer means 300, so as to be inclined.

A mount 121, which is opposed to the mount 120, is fixed to one gate type columnar member 201, and a transfer unit 128 adapted to reciprocatingly move the first drawing means 100a is provided on these mounts 120 and 121.

Namely, a reversible motor 123 having a chain wheel 124 is provided on the mount 121, and a chain wheel 125 on the mount 120 in such a manner that the chain wheel 125 is opposed to the chain wheel 124. A chain 126 is wrapped around these two chain wheels 124 and 125 and fixed to the mount 122 via a fixing member 127.

The operation of the above-described system M for feeding rod type materials is as follows.

A plurality of rod type materials S are supplied in a bundled state onto the rod-untying rack 21. When a wire, with which the rod type materials S are bound, is removed, the rod type materials S roll to the side of the rod-untying rack 21 which is close to the adjacent storage rack 31 (refer to FIG. 2).

The control unit 400 is then operated to carry out a series of operations, which will be described later.

When the feed means 20 provided on the rod-untying rack 21 are actuated to cause the heads 25 thereof to be displaced upward, several rod type materials S among the plural rod type materials S are lifted thereby. When the upper surfaces 26 of the heads 25 become higher than an upper surface of the frame member 61, the rod type materials S drop onto the storage rack 31. When the heads 25 reach their upper limit positions, they move down to return to positions lower than the floor beams 22. The above operations are repeated to supply in order the rod type materials S in the rod-untying rack 21 onto the storage rack 31.

In the meantime, the first take-up means 30 is operated on the storage rack 31. When the head 35 is displaced upward, one end portion of one of a plurality of rod type materials S is lifted thereby. When the head 35 reaches an upper limit position, the clamp members 103 of the first clamp means 100 move down to a height equal to that of the rod type material S as shown in FIG. 3. The clamp members 103 are then closed to grip the rod type material S firmly, and the detector in the clamp members 103 simultaneously generates a signal representative of the rod type material S, which signal is transmitted to the counter in the control unit 400. Such signals are totalized in the control unit 400, and the number of the rod type materials S is stored in a memory (not shown) and simultaneously indicated on a display unit (not shown).

The clamp members 103a of the first drawing means 100a aare then moved down to loosely hold the rod type material S fixed in the clamp members 103. When the rod type material S has been gripped by the clamp members 103 and 103a, the latter are moved up to return to the original positions.

When the reversible motor 123 in the transfer unit 128 is then rotated clockwise, the chain wheel 124 is rotated to cause the chain 126 to turn in the same direction. In accordance with the movement of the chain 126, the first drawing means 100a is displaced in the direction of an arrow C. Owing to the displacement of the first drawing means 100a, the rod type material S as a whole is kept substantially horizontal as shown in FIG. 3, to be completely separated from the other rod type materials.

As shown in FIG. 3, when the first drawing means 100a reaches a predetermined position, the transfer unit 128 is stopped.

The retractable means 101 and 101a are then moved pivotally by the auxiliary retractable means 110 and 110a toward the feed rack 41 or in the direction of the arrow A. When the clamp members 103 and 103a reach positions above the feed rack 41, the pivotal movement of the retractable means 101 and 101a is stopped.

When the clamp members 103 and 103a are then opened, the rod type material S drops therefrom onto the feed rack 41.

When a predetermined number of rod type materials S have thus been piled up on the feed rack 41, the support members 45 of the stoppers 40 are retracted to positions below the floor beams 42. Consequently, the rod type materials S roll over the floor beams 42 to drop onto the transfer means 300 automatically.

When the transfer means 300 is then actuated, a predetermined number of rod type materials S are all moved in the direction of an arrow B as shown in FIG. 1 to a subsequent processing step.

While the rod type materials S are transferred to a subsequent step by the transfer means 300, the first clamp means 100, first drawing means 100a and support members 45 of the stoppers 40 return to their respective original positions.

The operations of the feed means, take-up means 30, first clamp means 100, first drawing means 100a, stoppers 40 and transfer means 300 can be carried out by operating the control unit 400 manually, and also fully automated by employing, for example, a sequence circuit.

Figure 4:
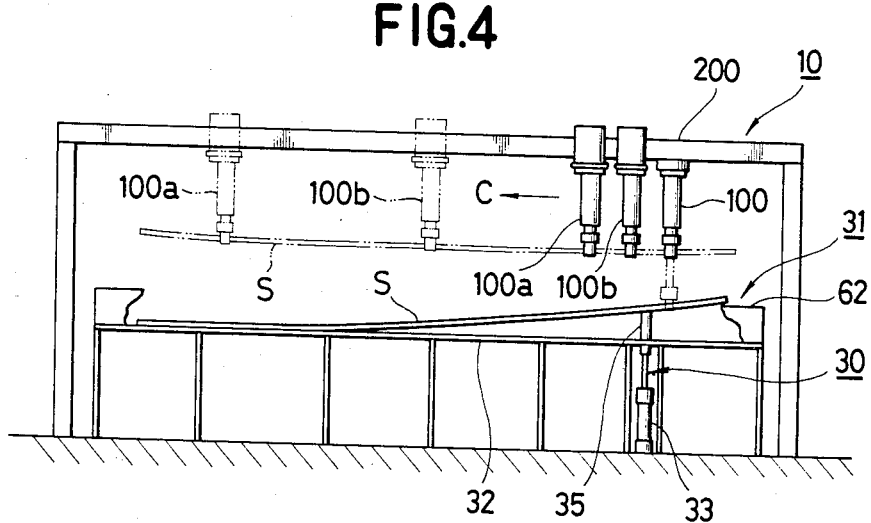
FIG. 4 is a front elevational view of a second embodiment of the present invention.

FIG. 4 shows a second embodiment, which is provided as shown in FIGS. 4-7 with a second drawing means 100b, which has the same construction as the first drawing means 100a, in addition thereto.

In the second embodiment, a second drawing means 100b is provided between the first clamp means 100 and first drawing means 100a. The second drawing means 100b is adapted to be moved to a middle position between the first clamp means 100 and first drawing means 100a. This can prevent an intermediate portion of a rod type material S from being slackened. A transfer unit (not shown) having the same construction as the transfer unit 128 is provided parallel thereto for moving the second drawing means 100b.

Figure 5:
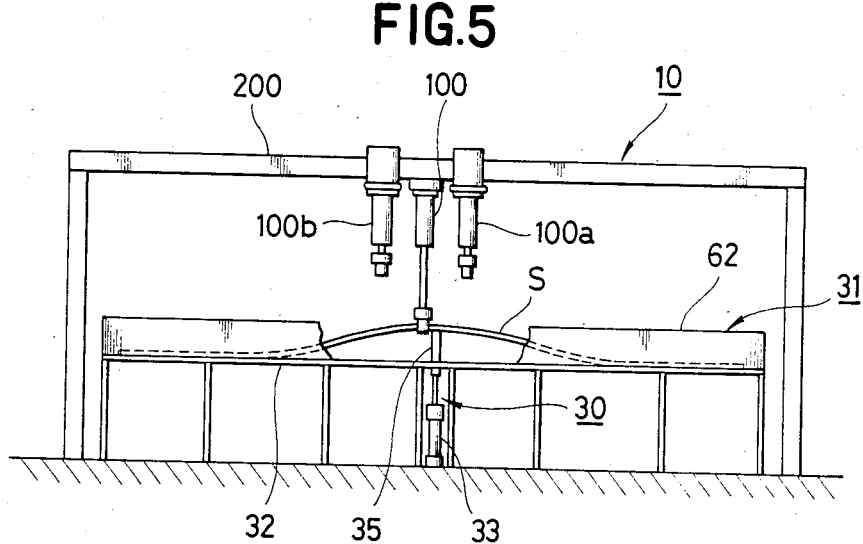
FIGS. 5–7 are front elevational views of a third embodiment of the present invention.
Figure 6:
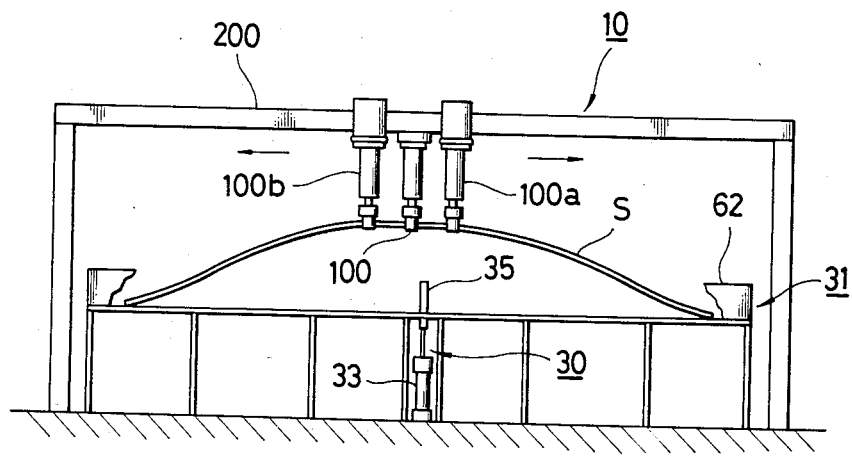
Figure 7:
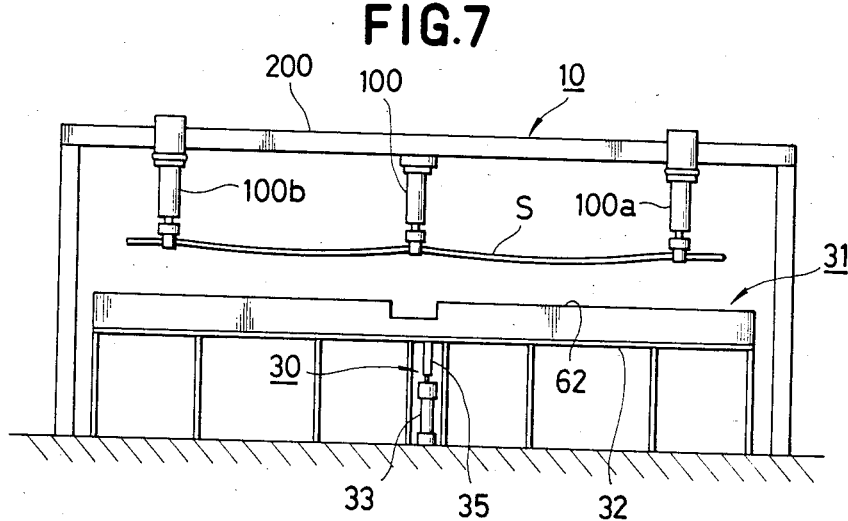

FIGS. 5-7 show a third embodiment, in which the take-up means 30 is provided on the central portion of the storage rack 31. The first clamp means 100 is provided on the portion of the track 20 which is opposed to the take-up means 30. The first drawing means 100a is provided on one side of the first clamp means 100, and the second drawing means 100b on the other side thereof. According to this embodiment, the time, for which the first and second drawing means 100a and 100b travel a predetermined distance can be reduced by half.

Figure 8:
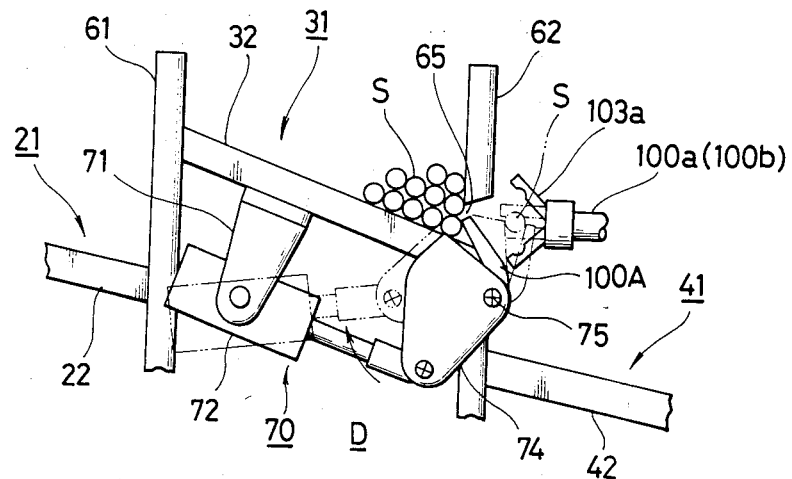
FIG. 8 is a side elevational view of a fourth embodiment of the present invention.
Figure 9:
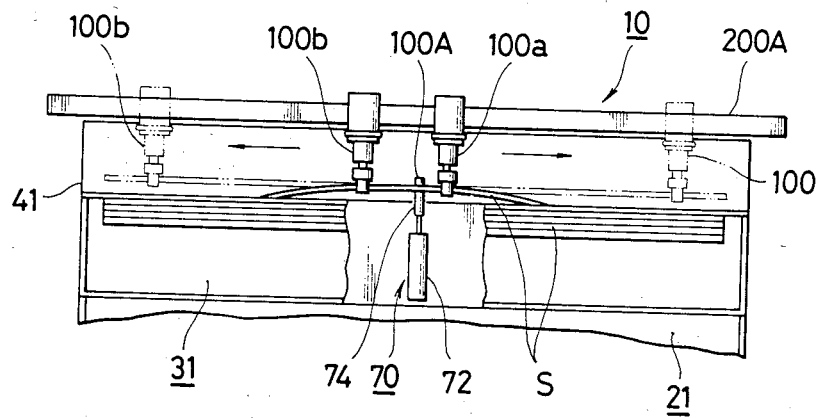
FIG. 9 is a plan view of the fourth embodiment of the present invention.

FIGS. 8 and 9 show a fourth embodiment, in which a second take-up means 70 is provided under the central portion of the storage rack 31. The second take-up means 70 consists of a head 74 pivotably connected via a shaft 75 to the third frame member 62, and retractable means 72 connected pivotably to the head 74 and composed of a hydraulic cylinder or a pressure air cylinder. The head 74 is provided so as to be opposed to an opening 65 formed in the third frame member 62. The opening 65 is provided in the portion of the third frame member 62 which is on extension lines of the floor beams 32 of the rack 31. The opening 65 is wide enough to pass a rod type material S therethrough. The retractable means is pivotably connected to a support member 71 fixed to a floor beam 32 of the storage rack 31.

The head 74 of the second take-up means 70 is provided with a second claw type clamp means 100A. The second clamp means 100A is provided with a detector (not shown) referred to previously. When a rod type material S is detected, a signal representative thereof is transmitted from the detector to the control unit 400.

The first and second drawing means 100a and 100b are provided in opposition to and in front of the second take-up means 70. The first and second drawing means 100a and 100b are positioned above the feed rack 41 and movably set on a track 200A having the same construction as the track 200.

The second take-up means 70 and second clamp means 100A are normally in the condition shown in full line, in which a rod type material S is held between the head 74 of the second take-up means 70 and the second claw type clamp means 100A. When the means 72 is retracted, the head 74 of the second take-up means 70 is moved pivotally in the direction of an arrow D. Consequently, a part of an iron reinforcing rod S is withdrawn from the storage rack 31 to the feed rack 41 as shown in broken line.

The rod type material S is then supported on the first and second drawing means 100a and 100b. As these two drawing means 100a and 100b are moved along the track 200A in the directions of arrows, the material S as a whole is separated and taken out from the storage rack 31 (refer to FIG. 9).

When the clamp members 103a of the first and second drawing means 100a and 100b and the second clamp means 100A are then opened, the rod type material S drops onto the feed rack 41.

Figure 10:
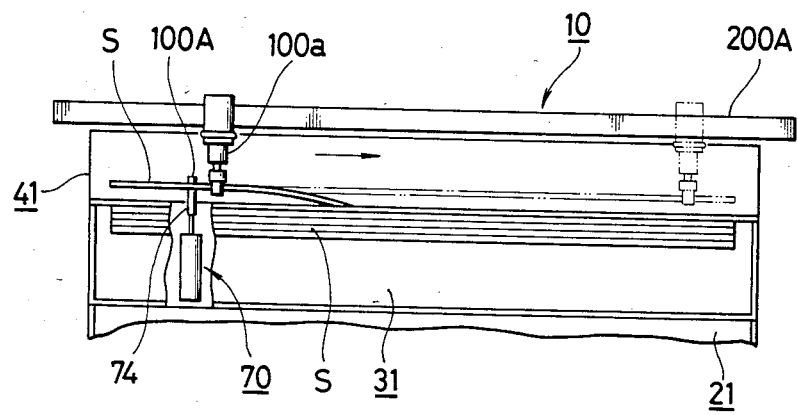
FIG. 10 is a plan view of the fifth embodiment of the present invention.

FIG. 10 shows a fifth embodiment, which is constructed more simply than the fourth embodiment. The fifth embodiment has one first drawing means 100a, and also a take-up means 70 and a second clamp means 100A, which are provided at one end portion of a storage rack 31. The construction of the remaining portions of the fifth embodiment is identical with that of the corresponding portions of the fourth embodiment (refer to FIG. 10).

Figure 11:
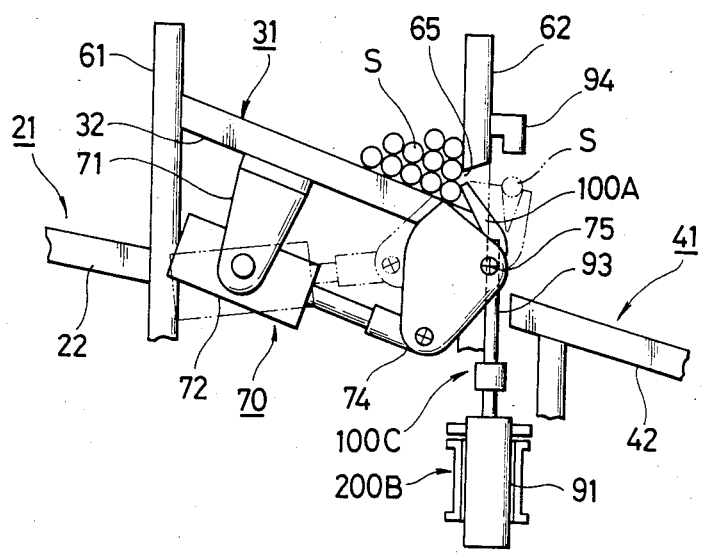
FIG. 11 is a side elevational view of a sixth embodiment of the present invention.
Figure 12:
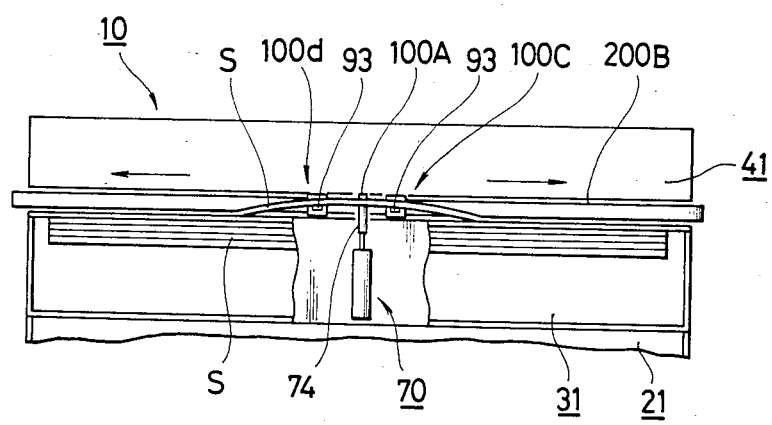
FIG. 12 is a plan view of the sixth embodiment of the present invention.

FIGS. 11 and 12 show a sixth embodiment. This embodiment is formed in the same manner as the fourth embodiment except that third and fourth drawing means 100c and 100d, which will be described later, are used instead of the first and second drawing means 100a and 100b.

As shown in FIG. 11, the third drawing means 100c has a plate type drawing member 93 extending along the third frame member 62 and fixed to a free end of a retractable means 91, which consists of a hydraulic cylinder or a pressure air cylinder. This retractable means 91 is provided movably on a track 200B extending parallel to the storage rack 31. A guide 94 for the drawing member 93 is also provided on the third frame member 62. The fourth drawing means 100d has the same construction as the third drawing means 100c.

When a part of a rod type material S is withdrawn from the storage rack 31 into the feed rack 41 by the second take-up means 70 and second clamp means 100A, the drawing members 94 of the third and fourth drawing means 100c and 100d are inserted between the third frame member 62 and iron reinforcing rod S. When the third and fourth drawing means 100c and 100d are moved along the track 200B in the direction of arrows, the rod type material S is withdrawn from the storage rack 31 into the feed rack 41 by the drawing members 94 thereof. When the second clamp means 100A is then opened, the rod type material S drops onto the feed rack 41.

Figure 13:
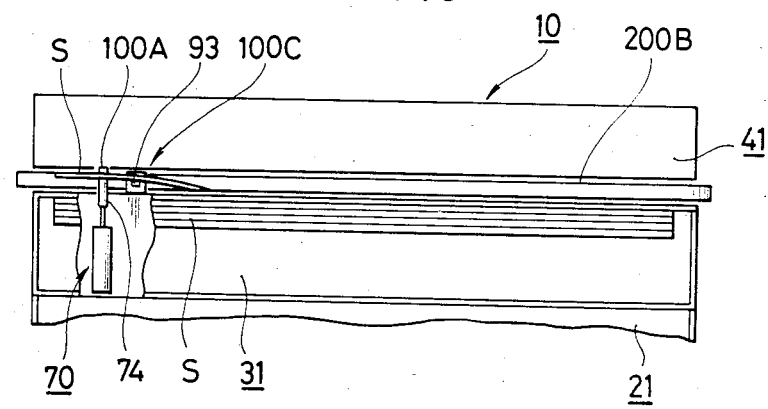
FIG. 13 is a plan view of the seventh embodiment of the present invention.

FIG. 13 shows a seventh embodiment, which is formed by simplifying the sixth embodiment. The seventh embodiment employs a third drawing means 100c only, and a take-up means 70 and a second clamp means 100A, which are provided at one end portion of the storage rack 31. The remaining portions of this embodiment are constructed in the same manner as the sixth embodiment.

We claim:

1. An apparatus for taking up rod type bodies, comprising at least one take-up means, which is provided on a rack used to temporarily store a plurality of rod type bodies thereon, and which is adapted to separate a certain rod type body from the plural rod type bodies, at least one clamp means provided in opposition to said take-up means and adapted to fix therein said rod type body separated by said take-up means, and at least one means for slidably grasping said rod type body fixed in said clamp means, and means for moving said grasping means in the lengthwise direction of said rack.

2. An apparatus for taking-up rod type bodies comprising:
    a storage rack for temporarily storing rod type bodies thereon, provided with take-up means for pushing up the rod type bodies one at a time,
    clamp means for firmly holding each rod type body pushed up by the take-up means, at a point along the length of the rody type body, said clamp means being disposed above said storage rack and secured to a track mounted above and parallel to the storage rack; and
    means movable along the track for slidably grasping the rod type body so as to raise said rod type body held by the clamp means, said clamp means having an auxiliary retractable means for pivoting the clamp means to the side of a feed rack disposed adjacent to the storage rack, said means movable along the track for slidably grasping the rod type body having an auxiliary retractable means for pivoting the means movable along the track for slidably grasping the rod type body.

3. The apparatus of claim 2, wherein said take-up means includes a head having a recess large enough to therein receive a single rod type body and movable upwardly and downwardly by a retractable means.

4. The apparatus of claim 2, wherein said clamp means comprises a pair of opposing clamp members pivotable to open and close with respect to each other, and retractable means for moving said pair of clamp members upwardly and downwardly.

5. The apparatus of claim 2, wherein said means movable along the track for slidably grasping the rod type body comprises a pair of opposing clamp members pivotable to open and close with respect to each other and retractable means for moving said pair of clamp members upwardly and downwardly, each of said clamp members having a recess having a radius greater than that of the rod type bodies.

6. An apparatus for taking-up rod type bodies comprising:
    a storage rack having an opening and being provided with take-up means having a head disposed at the location of said opening;
    clamp means mounted to said head and pivotable relative to the head;
    a track disposed in front of said opening and parallel to said storage rack; and
    means movable along said track for slidably grasping a rod type body so as to raise said rod type body held between said head and clamp means of the take-up means.

* * * * *